Aug. 28, 1928.
J. E. BELL
1,681,926
HEAT TRANSFER
Filed Sept. 17, 1923
3 Sheets-Sheet 2
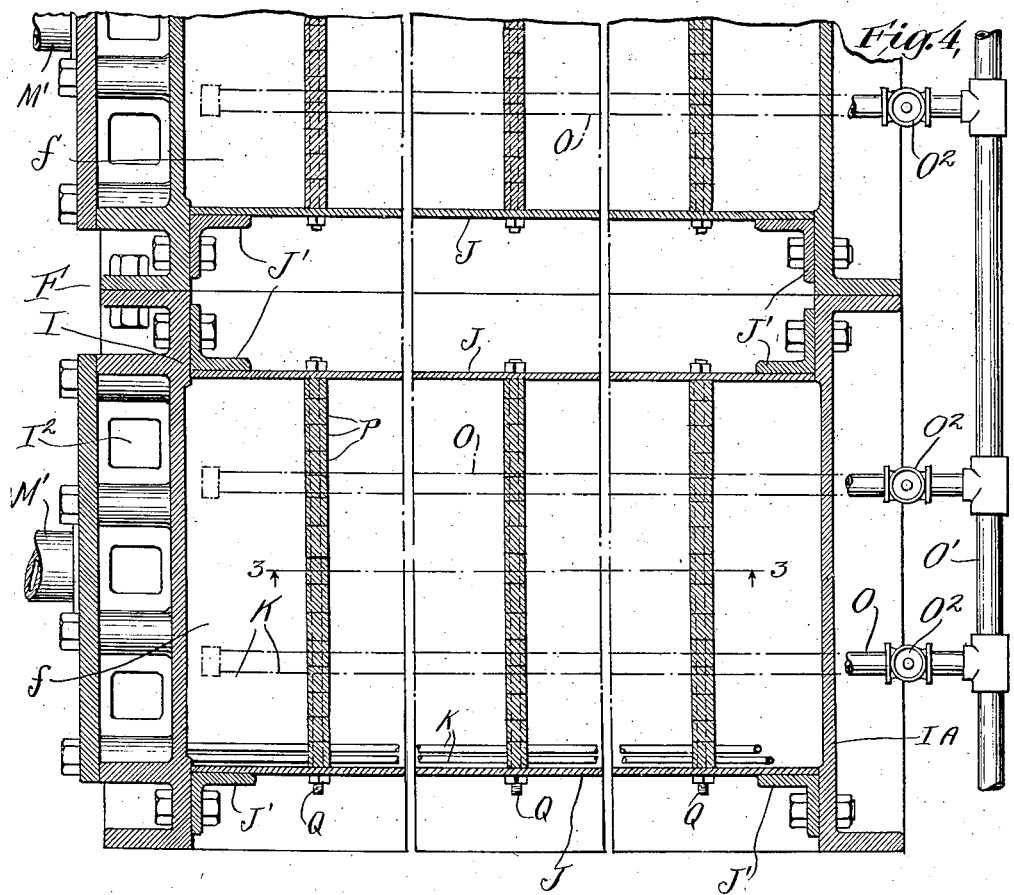
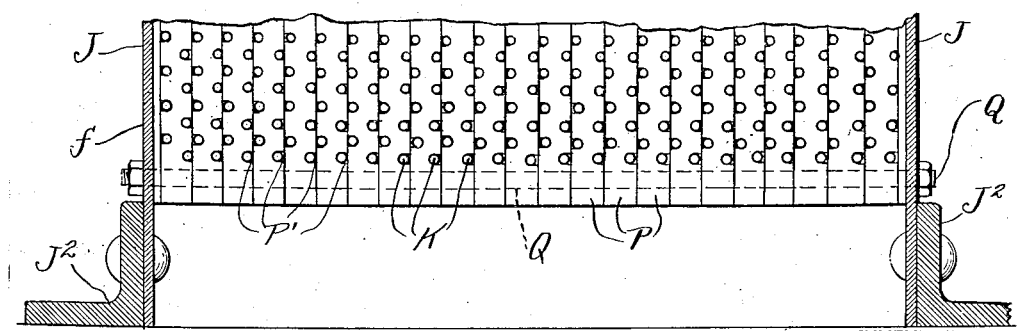
INVENTOR
John E Bell
BY
John E Hubbell
ATTORNEY

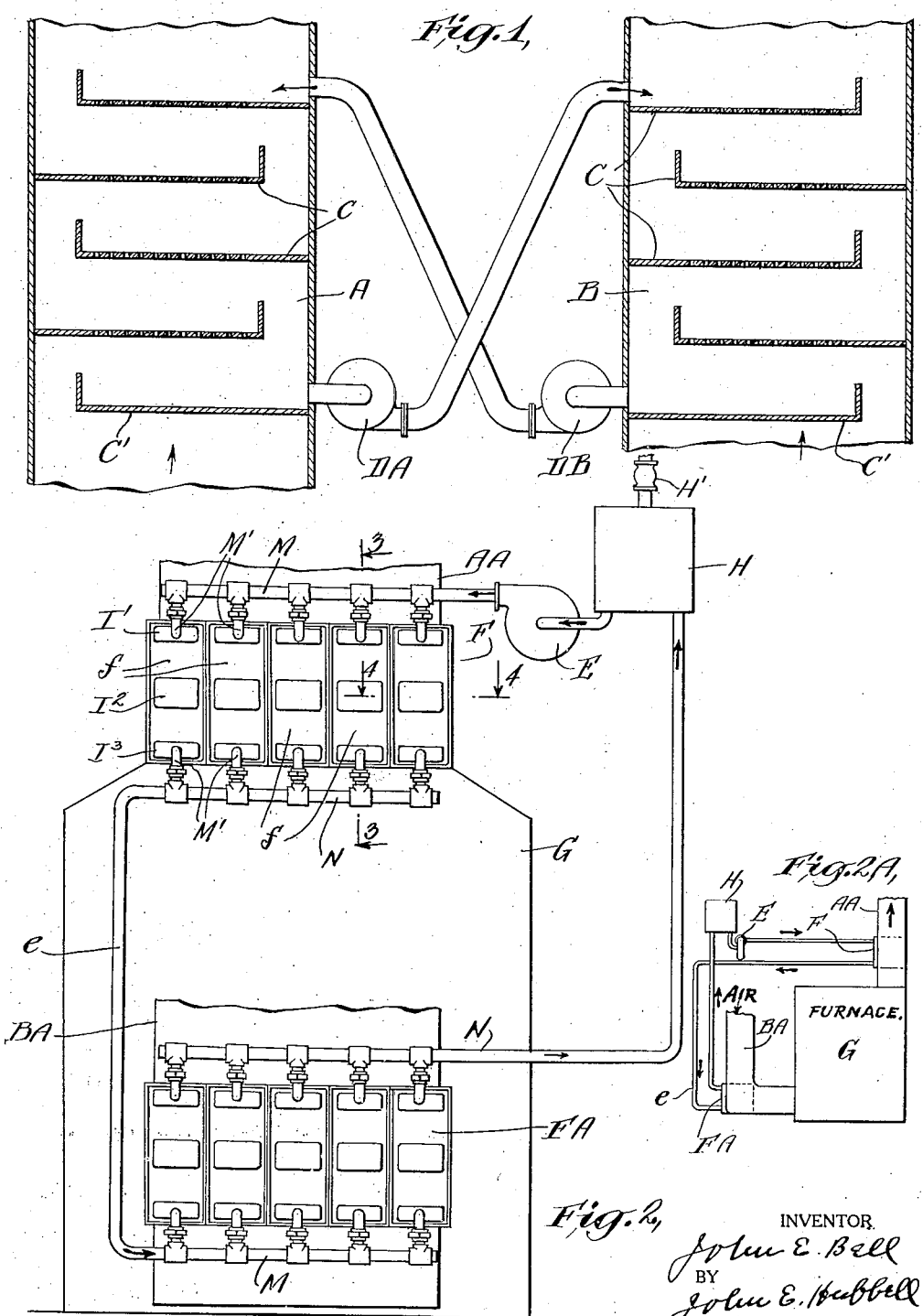

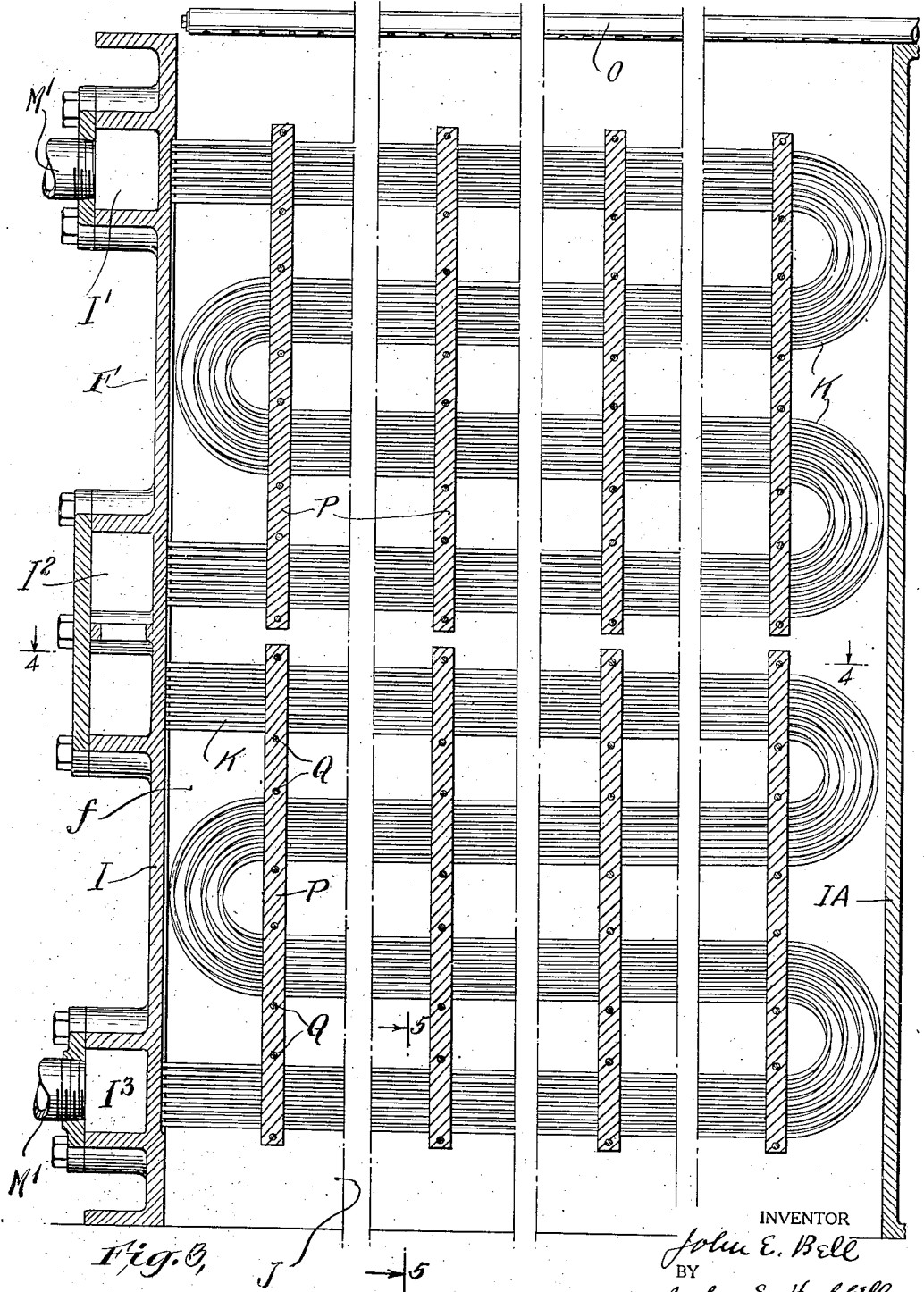

Patented Aug. 28, 1928.

1,681,926

UNITED STATES PATENT OFFICE.

JOHN E. BELL, OF BROOKLYN, NEW YORK, ASSIGNOR TO FOSTER WHEELER CORPORATION, OF NEW YORK, N. Y., A CORPORATION OF NEW YORK.

HEAT TRANSFER.

Application filed September 17, 1923. Serial No. 663,107.

The general object of my present invention is to provide an improved method of, and apparatus for absorbing heat from a source of heat and imparting it to an object or material to be heated. In carrying out my invention, I employ a fluid heat transfer vehicle or agent which I continuously circulate in a circuit including a heat absorption portion and a heat dispensing or cooling portion; and my invention is especially characterized by the division of the heating agent into a multiplicity of fine streams in the heat absorbing and cooling portions of the circulating system, whereby I secure an unusually high coeffiecient of heat transfer, and a corresponding reduction in the volume and weight of the apparatus required to transfer a given amount of heat.

The various features of novelty which characterize my invention are pointed out with particularity in the claims annexed to and forming a part of this specification; for a better understanding of this invention however, its advantages and specific objects attained with its use reference should be had to the accompanying drawings and descriptive matter in which I have illustrated and described a preferred embodiment of my invention.

Of the drawings:

Fig. 1 is a diagrammatic representation of one embodiment of my invention;

Fig. 2 is a somewhat diagrammatic representation of another embodiment of the invention;

Fig. 2^A is a small scale side elevation of the furnace shown in Fig. 2;

Fig. 3 is a section on the line 3—3 of Fig. 2 and of Fig. 4;

Fig. 4 is a section on the line 4—4 of Fig. 3; and

Fig. 5 is a section on the line 5—5 of Fig. 3.

In Fig. 1 I have illustrated the use of my invention in transferring heat from a fluid, such as the heating gases from a furnace, flowing upward through a flue A, to a cooler fluid, as air for combustion in the furnace, flowing upward through a flue B. In the flue A are a series of super-imposed trays or pans C with perforated bottoms, and a bottom tray or pan C' having an imperforate bottom which serves as a receiving vessel for a suitable liquid heat transfer agent, as mercury, which in regular operation is continuously supplied to the uppermost tray C, and flows downward from each upper tray C in the series, through the perforations in the bottom wall of the trays in a multiplicity of fine wire like pencils or streams. The flue B contains a set of trays C and C' which may be identical in construction and arrangement with those in the flue A. Means are provided for passing the heat transfer liquid from the bottom tray or receiving vessel C' in each of the flues A and B, to the topmost tray C in the other flue. The means shown for this purpose comprise a pump DA for passing the liquid from the tray C' in the flue A to the top tray C in the flue B, and a similar pump DB which passes the liquid from the bottom tray C' in the flue B to the top tray C in the flue A and thus maintains a continuous circulation of the heat transfer liquid through the system. In uses of the invention in which a bottom tray C' in either flue is at a level above that of the top tray C in the other flue, no pump may be required in the conduit connection between such trays.

In the operation of the apparatus shown in Fig. 1, the mercury flowing downward in finely divided streams through the spaces between the trays in the flue A absorbs heat from the gases passing upward through that flue, and gives up this heat in its passage in finely divided streams through the spaces between the trays in the flue B. The bulk of apparatus constructed as shown in Fig. 1, which is required for the transfer of a given number of heat units from the heating gases to the air to be preheated may be made very small as compared with that of apparatus heretofore used for this purpose. This results from the very high value of the heat transfer coefficient which is obtainable in this manner. The rate at which heat is absorbed from or imparted to a pencil or wire like body of small diameter, such as is formed by the mercury stream issuing through each small tray bottom perforation, is in approximately inverse proportion to the square root of the diameter of the pencil or cylinder. For example, a metal wire or rod one eighth of an inch in diameter and swept by a stream of hot gas will absorb heat approximately twice as rapidly as will a rod of the same metal and length and one half inch in diameter swept by the same stream of hot gas when the temperatures of the two rods are the same, although the larger rod has four times the heat absorption surface of the smaller rod, and weighs sixteen times as much. The use of mercury as a liquid transfer medium in open contact with the fluid substances between which the heat transfer is effected, as illustrated in Fig. 1, is highly satisfactory from the standpoint of thermal efficiency and bulk of apparatus required, but ordinarily is attended with an evaporation loss of the liquid heat transfer agent which is objectionable from the practical standpoint for most purposes of use.

Loss of the fluid heat transfer agent by evaporation can be avoided while retaining characteristic advantages of the invention by placing the agent in an enclosed circulation system, the heat absorption and dispensing portions of which are each formed by a group of tubes or hollow wires of suitably small diameter. The use of a closed circulating system permits of the employment of other fluid heat transfer agents than mercury, which is practically the only transfer agent available for use in such an open circulating system as is illustrated in Fig. 1. Mercury while an ideal transfer agent from the standpoint of thermal efficiency and bulk required, has a relatively low specific heat, so that the relatively large weight required for a given heat transfer effect and its relatively high cost per pound form practical objections to its use. Moreover, it objectionably attacks practically all metallic substances with which it comes in contact except iron, steel, and aluminum, and indeed attacks aluminum to some extent. In practice for such a use as that of preheating air with heat absorbed from relatively low temperature stack gases, I advantageously employ a suitable liquid hydrocarbon or hydrocarbon mixture which will not crack or vaporize to any significant extent under the temperature and pressure conditions to which it is subjected. A liquid hydrocarbon such as $C^{14}H^{30}$, or a mixture of generally similar hydrocarbons such as is found in a high flashing point kerosene is suitable for the purpose, and in Figs. 2 to 5 inclusive I have illustrated in some detail an air heater adapted for practical use with such a heat transfer agent, though mercury may be used in this apparatus as the heat transfer agent.

In the apparatus shown in Figs. 2 to 5 the liquid heat transfer medium is continuously circulated in regular operation through a closed circulating system comprising a heat absorbing portion or device F in the stack flue AA of a furnace G, and a heat dispensing portion or device FA in the flue BA through which air for combustion is supplied to the furnace. The circulating system also comprises a circulating pump E through which the fluid medium is passed from the outlet of the heat dispensing device FA to the inlet of the heat absorbing device F, and a conduit $e$ through which the fluid transfer medium passes from the outlet of the device F to the inlet of the device FA. Advantageously the circulating system comprises an expansion chamber H with a vent to the atmosphere which may normally be closed by a suitable back pressure valve H'.

The heat absorbing apparatus F in the particular form illustrated consists of a number of similar units or sections $f$, each of which comprises a box-like casing open at top and bottom to the sections of the stack flue AA above and below it. The casing portion of each section $f$ is formed by cast metal front and rear wall plates I and IA respectively, and wrought metal side plates J connected to the front and rear plates at the corners of the apparatus by angle bars J'.

As shown the adjacent flanged edges of the front and rear wall plates I and IA of adjacent sections $f$ are bolted together, and flanges $J^2$ are provided at the top and bottom edges of the side plates J which may be bolted to supporting beams or plates mechanically connecting the sections and closing the spaces between the adjacent sides of adjacent sections $f$.

Disposed in the casing of each section $f$ are a multiplicity of thin walled tubes K of small diameter. As shown each tube K is looped to provide four parallel limbs and is arranged with the four limbs horizontal and in the same vertical plane. The tubes K in each section $f$ are arranged in two sets, one above the other. The upper ends of the tubes in the upper set are suitably secured in openings in the back wall of a chamber I' formed in the front wall plate I. The lower ends of the tubes in the upper set and the upper ends of the tubes in the lower set are similarly secured in openings in the back wall of a chamber $I^2$, and the lower ends of the tubes in the lower set are secured in openings in the back wall of the chamber $I^3$ formed in the front plate I. The front walls of the chambers I', $I^2$, and $I^3$, are formed by removable cover plates or heads. The chambers I' of the various sections $f$ of the device F are connected each by a separate branch pipe M' to an inlet header M, and the various chambers $I^3$ are similarly connected by branch pipes M' to an outlet header N. The fluid transfer agent flowing downward through the upper set of tubes K in each section, passes into the lower set of tubes K through the corresponding chamber I². The tubes K require means for supporting them at intervals along the length of each tube limb. The means shown for this purpose comprise vertical tube sheets extending transverse to the tubes and suitably spaced between the front and rear wall plates I and IA. These tube sheets are formed in the construction illustrated, by vertical bar-like sections P having tube receiving notches P' in their side edges. The various bars P forming each sectional tube sheet are secured together in place between the corresponding side walls J by through bolts Q. Advantageously, as shown, adjacent tubes K in each set are vertically displaced with respect to one another so that the adjacent horizontal limbs of adjacent tubes are vertically displaced or staggered with respect to one another. This displacement is provided for as shown in Figs. 3, 4 and 5, by locating the notches P' at one side of each bar P at levels alternating with those at which the notches at the other side of the bar are located.

The device FA in the furnace air intake flue BA may be identical in construction with the device F. The inlet header M of the device F is connected to the outlet of a circulating pump E. The pump inlet is connected to an expansion tank H to which the outlet header N of the device FA is connected while the outlet header N of the device F is connected by the conduit e to the inlet header M of the device FA. In the assembled apparatus, the casing of each section f of the devices F and FA is thus traversed by a mass of closely spaced horizontal tube portions of small diameter. The smaller the diameter of these tubes, the higher the heat transfer coefficient of the apparatus and the smaller the bulk of the apparatus required for producing a given heat transfer effect.

In practice however, the extent to which the diameters of the tubes K may be reduced with advantage is limited, in part by the fact that the cost of manufacture and assembly of apparatus of given capacity increases as the size of the tubes diminishes, and by the fact that very small tubes lack strength to resist deformation; but the main limitation on the extent to which the tubes can be reduced in diameter with advantage, is the resistance to the flow of the liquid heat transfer agent through the tubes, which, when the latter are made unduly small, results in an undesirably high circulating pump delivery pressure and load.

The last mentioned limitation is especially important because a full realization of the advantages of the counter current flow effect and the maximum heat transfer effect possible in a given installation of the character illustrated in Figs. 2, 3, 4, and 5, requires a particular and relatively high velocity of flow of the fluid heat transfer medium through the tubes K. This velocity for maximum efficiency and capacity is given by the following equation:

$$A = \frac{B+C}{\frac{B}{D}+\frac{C}{E}}$$

In the foregoing equation, A is the product of the weight of the heat transfer agent flowing per unit of time into either of the devices F and FA, multiplied by the specific heat of said agent; B is the product of the heat transfer rate in the device F multiplied by the heat absorbing surface area of that device; C is the product of the heat transfer rate in the device FA multiplied by the heat dispensing surface area of that device; D is the product of the weight of the heating gases flowing into contact with the device F per unit of time multiplied by the specific heat of the heating gases; and E is the product of the weight of air flowing into contact with the device FA multiplied by the specific heat of the air.

It will be apparent from the foregoing equation that in such a use of the invention in an air heater as is illustrated in Figs. 2, 3, 4, and 5, wherein the weight of the air to be preheated is only five per cent or so less than the weight of the heating gases and the specific heats of the air and heating gases are approximately equal, the weight of the fluid heat transfer agent flowing through each device F and FA per unit of time, will be in approximately in the same proportion to the weight of the heating gases flowing past the device F in the same time, as exists between the specific heats of the heating gases and of the liquid transfer agent.

By way of illustration and example, rather than by way of limitation, I may state that the particular apparatus illustrated in Figs. 2, 3, 4, and 5, was designed for use with tubes three sixteenths of an inch in external diameter, and with tube walls one thirtysecond of an inch thick, so that the diameter of the tube bore is one eighth of an inch, and that the heat transfer apparatus comprising five units in each of the absorbing devices F and FA, with one hundred ninety two tubes, each about fourteen feet long, in each unit or section, was devised and is adapted to heat the necessary air for combustion of a coal fired boiler furnace from an initial temperature of 60° F., to a final temperature of 360° F., when the boiler is developing 2,000 boiler horse power per hour.

With the proportions specified, and assuming a normal condition of combustion of coal in the furnace and assuming that the heat transfer agent flowing through the tubes K has the specific heat of a high flashing point kerosene, the maximum heat transfer capacity of the apparatus will be obtained when the velocity of flow of the transfer agent through the tubes K is about 530 feet per minute.

Those skilled in the art will understand from the foregoing explanation, as well as from the dimensions stated above by way of example, that the use of the invention makes it possible to obtain a given heat transfer effect in air heaters and analogous apparatus the bulk of which is but a small fraction of the bulk of apparatus of the character now in use for obtaining the same heat transfer effect.

Those skilled in the art will understand that with the small diameter and close spacing of the tubes K in the device F, that device would quickly become inoperative from a practical standpoint, as a result of the accumulation of furnace dust in the device unless provisions were made for frequent and adequate cleaning. The best and most effective method of cleaning such apparatus is by washing it down with water, and for this purpose I have provided spray pipes O for discharging cleaning water above the tubes.

Advantageously these spray pipes are arranged to permit sectional cleaning of the device F. For example, as shown in Fig. 4, there are two spray pipes O above each unit $f$, and each spray pipe is individually connected to a supply pipe or header O' by an individual cut-off valve $O^2$. With this arrangement when any one unit $f$ is being cleaned the resultant disturbances in draft and other conditions of operation are confined to the unit being cleaned, and the remaining units may continue to operate in the normal manner. While the tendency of dust to accumulate on the tubes K is much less marked in the device FA than in the tubes F, I consider it ordinarily desirable to supply the tubes FA with water spray cleaning pipes similar to those used with the device F.

The tubes K may be formed of aluminum in a satisfactory and relatively inexpensive manner, and when the tubes K of either device F or FA are formed of aluminum it is desirable to make the rest of the device of the same metal to avoid electrolytic action. The relatively small bulk of the apparatus and the conditions of use are such as to make aluminum a relatively inexpensive and desirable metal out of which to make those devices; particularly as aluminum is not subject to corrosion by the conjoint action of the cleaning water and the sulphur constituents of the furnace gases.

While in accordance with the provisions of the statutes I have illustrated and described herein the best embodiments of my invention now known to me, it will be apparent to those skilled in the art that many formal changes may be made without departing from the spirit of my invention as set forth in the appended claims, and that certain features of my invention may sometimes be used with advantage without a corresponding use of other features. I am aware of proposals heretofore made for the use of sand as a medium for transferring heat from one fluid to another, but I do not regard sand as practically feasible for such use because sand does not flow and cannot be circulated as a liquid or a gas flows and can be circulated, and I intend the term "fluid", as used in this specification and in the appended claims to include liquids and gases but to exclude sand and analogous solid substances.

Having now described my invention, what I claim as new and desire to secure by Letters Patent, is:

1. The method of effecting a heat transfer between two fluids at different temperatures which consists in passing a fluid heat transfer medium along a path of flow including a portion in which said medium absorbs heat from the hotter of the two first mentioned fluids and a portion in which said medium imparts heat to the cooler of the two first mentioned fluids, and dividing the fluid heat transfer medium into a multiplicity of fine streams of predetermined fineness in each of said portions.

2. The method of transferring heat from a hotter fluid to a cooler fluid which consists in passing a fluid heat transfer medium along a path of flow comprising a portion in which said medium absorbs heat from the hotter fluid and a second portion in which the medium gives up heat to the cooler fluid, and in each of said portions dividing said medium into streams which are fine enough so that the rate of heat transfer is approximately in inverse proportion to the square root of the thickness of the streams.

3. The method of utilizing the heat in furnace waste heating gases to preheat the air supplied the furnace for combustion therein, which consists in transferring heat from said gases to a liquid heat transfer medium without appreciable vaporization of said medium and then transferring heat from said medium to the air to be preheated.

4. The combination with the heating gas outlet and air intake flues of a furnace, of heat transfer apparatus comprising a circulating system including a heat absorbing section in said outlet flue and a cooling section in said intake flue and means for circulating a fluid through said system.

5. Apparatus for utilizing the heat in waste furnace heating gases to preheat the air supplied the furnace for combustion, comprising a heat absorbing portion traversed by the waste gases and an air heating portion traversed by the air supplied the furnace to heat said combustion air, each of said portions comprising a multiplicity of small tubes, and means for passing a fluid heat transfer medium through a closed circuit in which the tubes in each of said portions is connected in series with the tubes in other portions.

6. The method of utilizing the heat in furnace waste heating gases to preheat the air supplied for combustion therein which consists in passing a liquid heat transfer medium into heat absorbing counter current flow relation with the heating gases and then into heat dispensing counter current flow relation with the air to be preheated, with a weight rate of flow which is in approximately the same proportion to the weight rate of flow of the heating gases as exists between the specific heats of the heating gases and transfer agent.

7. The method of operating heat transfer apparatus comprising one heat exchanger operating on the counter current principle for transferring heat from one fluid medium to a second fluid medium, and a second heat exchanger operating on the counter current principle through which the second medium is passed and from which it is returned to the first heat exchanger and in which the second medium transfers heat to a third medium, the improvement which consists in making the weight rate of flow of the second medium approximately that given in the following equation:

$$A = \frac{B+C}{\frac{B}{D}+\frac{C}{E}}$$

wherein A represents the product of the weight rate of flow and specific heat of the second medium; B represents the product of the heat transfer rate in the first heat exchanger and the heat absorbing surface area of the latter; C represents the product of the heat transfer rate in the second heat exchanger and the heat dispensing surface area of the latter; D represents the product of the weight rate of flow and specific heat of the first medium, and E represents the product of the weight rate of flow and the specific heat of the third medium.

Signed at New York City, in the county of New York and State of New York this 14th day of September, A. D. 1923.

JOHN E. BELL.